2,868,811

3β-ACYLOXY - 17β - HYDROXY - 17α - ETHYNYL-5-ANDROSTENES AND ANDROSTANES AND THEIR PREPARATION

Raymond O. Clinton, North Greenbush Township, and Arthur L. Beyler, Albany, N. Y., assignors to Sterling Drug Inc., New York, N. Y., a corporation of Delaware No Drawing. Application July 21, 1955
Serial No. 523,626

17 Claims. (Cl. 260—397.5)

This invention relates to new 3β-acyloxy-17β-hydroxy-17α-ethynylandrostanes and 3β-acyloxy-17β-hydroxy-17α-ethynyl-5-androstenes which have pituitary inhibitory activity without proportionate concomitant estrongenicity or androgenicity.

Of the several hormones secreted by the pituitary gland two produce certain structural and secretory changes in the gonads. These two gonadotropins are the follicile-stimulating hormone (FSH) and the interstitial cell-stimulating hormone (ICSH). In the male the FSH stimulates the testes to develop sex cells, while the ICSH brings about production of the testicular hormone. In the female FSH brings about the growth of the Graafian follicile while the ICSH stimulates ovulation, development of corpus luteum and the production of progesterone. Thus any agent which interferes with the pituitary secretion of FSH and ICSH will per force affect the development and endocrine function of the testes and ovaries. Such an agent is useful in the treatment of endocrinological disturbances such as menopausal syndrome, endometriosis, postpartum breast engorgement, benign prostatic hypertrophy, functional uterine bleeding, chronic cystic mastitis, supression or termination of reproductive processes.

The steroidal hormones, estradiol and testosterone, are pituitary inhibitors but their use leads to very undesirable effects such as feminization and masculinization respectively and in other ways creating a sexual imbalance. Thus, for these steroidal hormones, the ratio of the pituitary inhibition (anti-FSH and anti-ICSH) to the estrogenic or androgenic activity is low due to the fact that the pituitary elaboration of gonadotropin is inhibited but the sex accessory organs are stimulated.

Our new compounds are much more specific than the steroidal hormones as pituitary inhibitors because of their low estrogenic and androgenic activity. The estrogenic activity of our new compounds varies from $\frac{1}{10,000}$ to $\frac{1}{50,000}$ that of estradiol and the androgenic activity is of such a low order that it can not be measured unless doses, much too high to have physiological significance, are used. Therefore, the ratio of the anti-FSH or anti-ICSH activity to the estrogenic and androgenic activity is high and hence the compounds have a much higher degree of specificity as pituitary inhibitors. The elaboration of gonadotropins is inhibited to such an extent that nearly maximal atrophy of the sex organs results.

The compounds can be administered by intramuscular injection of 50 mg./cc. sterile aqueous or saline suspensions containing 1:10,000 parts of hexylresorcinol. Intramuscular injection of a 40 mg./cc. solution of the compounds in a vegetable oil such as cottonseed oil can be used if desired. Alternatively, the compounds can be administered orally as 25 mg. capsules or tablets. The compounds are active at a level of 0.2–5 mg./kg. body weight.

The compounds of the invention are new mono esters of 17α-ethynylandrostane-3β,17β-diol having the formula

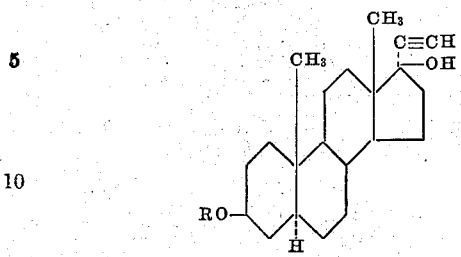

and of 17α-ethynyl-5-androstene-3β,17β-diol having the formula

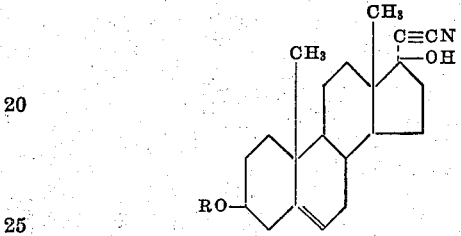

wherein R is a member of the class consisting of alkanoyl radicals having from 3 to about 10 carbon atoms and carboxy-alkanoyl radicals having from 4 to 6 carbon atoms. The invention also relates to a method for preparation of these new compounds.

In the above general formulas, R can be alkanoyl such as propionyl, butyrl, isobutyryl, valeryl, isovaleryl, trimethylacetyl, caproyl, isocaproyl, heptanoyl, octanoyl, nonanoyl, decanoyl, etc., wherein the alkanoyl group has from 3 to about 10 carbon atoms; and carboxy-alkanoyl, such as succinyl, glutaryl and adipyl.

Our new compounds are prepared from the known 17α-ethynylandrostane-3β,17β-diol and 17α-ethynyl-5-androstene-3β,17β-diol by esterification with an acylating agent such as the appropriate acid anhydride or acid halide under anhydrous conditions at about room temperature. The hydroxyl group in the 3-position is esterified before the 17-hydroxyl group because the former is a secondary alcohol whereas the latter is a tertiary alcohol. A hydroxyl group at the 17-position, which also has a further substituent, is sterically hindered and hence less reactive than the unhindered 3-hydroxyl group. Under the above mentioned conditions, the formation of the corresponding diester is sufficiently suppressed to allow isolation of pure mono ester in good yields. Any diester formed is readily separated by fractional crystallization or chromatographic separation on silica gel. Although solutions of the mono esters containing some of the corresponding diester can be used, it is preferable to use the pure compounds in therapy.

The preferred method for preparation of the new compounds is esterification of the appropriate diol with an acid anhydride at room temperature under anhydrous conditions. The reaction mixture is quenched in dilute acid and the desired product removed by filtration. After recrystallization the pure mono esters are obtained in 80–90% yields.

Alternatively, the reaction mixture resulting from the esterification with either an acid anhydride or acid halide after quenching in dilute acid can be purified by passage through a chromatographic column. Any diester formed is removed from the column first due to its greater solubility in the ether-n-pentane eluate. The desired mono ester is then obtained by evaporation of the later eluates, The application of heat leads to the formation of by-products which necessitate the use of a chromatographic column for satisfactory separation except in the preparation of the carboxyl-acyl compounds which require heating for monoesterification as illustrated in Example 8.

Diesters of 17α-ethynylandrostane-3β,17β-diol and 17α-ethynyl-5-androstene-3β,17β-diol can be prepared by carrying out the above-mentioned procedures at a higher temperature or for longer periods of time. However, good yields of diester can be obtained by the use of a catalyst such as p-toluenesulfonic acid at room temperature as is illustrated in Example 13.

The following examples will further illustrate the invention without limiting the invention thereto.

Example 1

3β-propionoxy-17β-hydroxy-17α-ethynyl-5-androstene.—A solution of 25.16 g. of 17α-ethynyl-5-androstene-3β,17β-diol in 150 ml. of pure anhydrous pyridine at 25–30° C. was treated with 15.6 g. of pure propionic anhydride. After mixing well, the clear solution while protected from moisture was kept at 25–30° C. for twenty-four to thirty-six hours. The resulting clear solution was poured into a mixture of 1 kg. of ice, 70 ml. of concentrated sulfuric acid, and 500 ml. of water. The solid which separated was collected by filtration, washed thoroughly with water, and recrystallized first from 50% aqueous methanol, then from 300 ml. of methanol. There was thus obtained 24.98 g. of 3β-propinoxy-17β-hydroxy-17α-ethynyl-5-androstene, M. P. 151.4–153.2° C. (corr.); $[\alpha]_D^{25} = -109.9° \pm 0.3°$ (1% in chloroform).

Analysis.—Calcd. for $C_{24}H_{34}O_3$: C, 77.80; H, 9.25. Found: C, 77.61; H, 9.41.

Example 2

3β-butyroxy-17β-hydroxy-17α-ethynylandrostane was prepared from 3.16 g. of 17α-ethynylandrostane-3β,17β-diol and 3.0 ml. of butyric anhydride in 25 ml. of pyridine by the manipulative procedure described in Example 1. The 1.69 g. of 3β-butyroxy-17β-hydroxy-17α-ethynylandrostane thus obtained had the M. P. 149.8–154.6° C. (corr.); $[\alpha]_D^{25} = -35.1° \pm 0.3°$ (1% in chloroform).

Analysis.—Calcd. for $C_{25}H_{38}O_3$: C, 77.67; H, 9.91. Found: C, 77.68; H, 10.10.

Example 3

3β-valeroxy-17β-hydroxy-17α-ethynylandrostane was prepared from 6.32 g. of 17α-ethynylandrostane-3β,17β-diol and 10 ml. of valeric anhydride in 50 ml. of pyridine according to the manipulative procedure described in Example 1. There was thus obtained 3.67 g. of 3β-valeroxy-17β-hydroxy-17α-ethynylandrostane, M. P. 164.2–166.6° C. (corr.); $[\alpha]_D^{25} = -34.5° \pm 0.2°$ (1% in chloroform).

Analysis.—Calcd. for $C_{26}H_{40}O_3$: C, 77.75; H, 10.07. Found: C, 77.65; H, 9.91.

Example 4

3β-caproxy-17β-hydroxy-17α-ethynylandrostane was prepared 6.32 g. of 17α-ethynylandrostane-3β,17β-diol and 11.5 ml. of caproic anhydride in 50 ml. of pyridine according to the manipulative procedure described in Example 1. The 3.63 g. of 3β-caproxy-17β-hydroxy-17α-ethynylandrostane thus obtained had the M. P. 118.6–121.6° C.; $[\alpha]_D^{25} = -34.3° \pm 0.4°$ (1% in chloroform).

Analysis.—Calcd. for $C_{27}H_{42}O_3$: C, 78.21; H, 10.21. Found: C, 78.39; H, 10.50.

Example 5

3β-valeroxy-17β-hydroxy-17α-ethynyl-5-androstene.—A solution of 3.14 g. of 17α-ethynyl-5-androstene-3β,17β-diol and 4.65 g. of N-valeric anhydride in 25 ml. of pure dry pyridine was kept at 25–35° C. for twenty-four hours under anhydrous conditions. The clear, colorless solution was poured into a mixture of 500 g. of ice, 10 ml. of concentrated sulfuric acid and 200 ml. of water, and the resulting suspension mixed well and filtered. The crude product was washed thoroughly with water, dried at 50° C., then dissolved in 50 ml. of pure anhydrous ether and the solution diluted to 400 ml. with n-pentane. The resultant solution was chromatographed on 200 g. of silica gel using 400 ml. portions, or 12½% ether-n-pentane as eluate. The crystalline residues obtained by evaporation of the eighth through the fifteenth fractions were combined and recrytallized three times from n-hexane. There was thus obtained 2.83 g. of 3β-valeroxy-17β-hydroxy-17α-ethynyl-5-androstene having the M. P. 129.0–131.2° C. (corr.); $[\alpha]_D^{25} = -98.8° \pm 0.3°$ (1% in chloroform).

Analysis.—Calcd. for $C_{26}H_{38}O_3$: C, 78.35; H, 9.61. Found: C, 78.27; H, 9.72.

Example 6

3β-butyroxy-17β-hydroxy-17α-ethynyl-5-androstene was prepared from 3.14 g. of 17α-ethynyl-5-androstene-3β,17β-diol and 2.4 ml. of butyric anhydride in 25 ml. of pyridine by the manipulative procedure described in Example 5. The 3β-butyroxy-17β-hydroxy-17α-ethynyl-5-androstene thus obtained weight 1.37 g. and had the M. P. 115.4–117.0° C. (corr.); $[\alpha]_D^{25} = -102.5° \pm 0.3°$ (1% in chloroform).

Analysis.—Calcd. for $C_{25}H_{36}O_3$: C, 78.08; H, 9.44. Found: C, 78.14; H, 9.58.

Example 7

3β-caproxy-17β-hydroxy-17α-ethynyl-5-androstene was prepared from 3.14 g. of 17α-ethynyl-5-androstene-3β, 17β-diol and 5.8 g. of caproic anhydride in 25 ml. of pyridine by the manipulative procedure outlined in Example 5. The 3β-caproxy-17β-hydroxy-17α-ethynyl-5-androstene weighed 2.96 g. and had the M. P. 106.6–107.4° C. (corr.); $[\alpha]_D^{25} = -94.2° \pm 0.2°$ (1% in chloroform).

Analysis.—Calcd. for $C_{27}H_{40}O_3$: C, 78.59; H, 9.77. Found: C, 78.32; H, 9.89.

Example 8

3β-succinoxy-17β-hydroxy-17α-ethynyl-5-androstene.—A mixture of 3.14 g. of 17α-ethynyl-5-androstene-3β,17β-diol, 1.50 g. of succinic anhydride and 25 ml. of pure dry pyridine was refluxed under anhydrous conditions for three hours, then poured into a mixture of 300 g. of ice, 10 ml. of concentrated sulfuric acid and 100 ml. of water. The crude product which separated was removed by filtration, washed thoroughly with water and dried at 70° C. The dried material was recrystallized three times from small volumes of methanol to give 1.6 g. of 3β-succinoxy-17β-hydroxy-17α-ethynyl-5-androstene, M. P. 203.0–204.4° C. (corr.); $[\alpha]_D^{25} = -92.6° \pm 0.7°$ (0.5% in chloroform).

Analysis.—Calcd. for $C_{25}H_{34}O_5$: C, 72.43; H, 8.27. Found: C, 72.20; H, 8.32.

Example 9

3β-trimethylacetoxy-17β-hydroxy-17α-ethynylandrostane.—A mixture of 3.0 g. of trimethylacetic acid, 3.0 g. of pure thionyl chloride and 10 ml. of pure dry benzene was refluxed under anhydrous conditions for three and one-half hours. The resulting solution was cooled to room temperature (25–32° C.) and then a solution of 3.16 g. of 17α-ethynylandrostane-3β,17β-diol in 100 ml. of pure dry pyridine was added. The resulting mixture was allowed to stand at room temperature for seventeen hours. The heterogeneous mixture which resulted was poured into 150 ml. of water and the precipitated semi-solid material extracted into ether. The ethereal solution was washed with dilute hydrochloric acid and then with dilute sodium bicarbonate, and then dried over anhydrous magnesium sulfate. The solution was concentrated to a volume of 100 ml., then diluted with 400 ml. of n-pentane and chromatographed on a column of 300 g. silica gel.

The column was eluted with successive 500 ml. portions of a mixture containing 20% ether-80% n-pentane. The combined crystalline material from the evaporation of fractions six through eleven was recrystallized twice from n-hexane to yield 2.14 g. of 3β-trimethylacetoxy-17β-hydroxy-17α-ethynylandrostane, M. P. 216.2–218.0° C. (corr.); $[\alpha]_D^{25} = -37.9° \pm 0.3°$ (1% in chloroform).

*Analysis.*—Calcd. for $C_{26}H_{40}O_3$: C, 77.95; H, 10.07. Found: C, 78.09; H, 10.19.

Example 10

3β - trimethylacetoxy - 17β-hydroxy-17α-ethynyl-5-androstene was prepared from 3.0 g. of 17α-ethynyl-5-androstene-3β,17β-diol, 3.0 g. of trimethylacetic acid, 3.0 g. of thionyl chloride in 100 ml. of pyridine according to the manipulative procedure of Example 9. There was thus obtained 1.18 g. of 3β-trimethylacetoxy-17β-hydroxy-17α-ethynyl-5-androstene, M. P. 200.0–202.6° C. (Corr.); $[\alpha]_D^{25} = -97.2° \pm 0.3°$ (1% in chloroform).

*Analysis.*—Calcd. for $C_{26}H_{38}O_3$: C, 78.35; H, 9.61. Found: C, 78.40; H, 9.85.

Example 11

3β - octanoyloxy-17β-hydroxy-17α-ethynyl-5-androstene was prepared from 4.71 g. of 17α-ethynyl-5-androstene-3β,17β-diol and 2.68 g. of octanoyl chloride in 20 ml. of pyridine according to the method described in Example 9. The 3.12 g. of 3β-octanoyloxy-17β-hydroxy-17α-ethynyl-5-androstene thus obtained had the M. P. 94.0–95.6° C. (corr.); $[\alpha]_D^{25} = -87.4° \pm 0.4°$ (1% in chloroform).

*Analysis.*—Calcd. for $C_{29}H_{44}O_3$: C, 79.04; H, 10.06. Found: C, 79.22; H, 10.30.

Example 12

3β - propionoxy-17β-hydroxy-17α-ethynylandrostane.—A mixture of 3.00 g. of 17α-ethynylandrostane-3β,17β-diol, 15 ml. of propionic anhydride and 10 ml. of pure, anhydrous pyridine was heated on the steam bath under anhydrous conditions for forty-five minutes, then poured into 700 ml. of cold water and the heterogeneous mixture allowed to stand for two hours. The precipitate was removed by filtration, washed thoroughly with water, and dried at 70° C. The crude material was dissolved in 80 ml. of pure, dry ether and diluted with 720 ml. of n-pentane, then chromatographed on a column of 250 g. silica gel. The column was first eluted with nine 800 ml. portions of 10% ether-n-pentane mixture, and then with ten 800 ml. portions of 20% ether-n-pentane mixture. The third, fourth and fifth 20% ether-n-pentane eluates were evaporated to dryness and the resulting crystalline material was recrystallized from methanol to give 1.78 g. of 3β - propionoxy-17β-hydroxy-17α-ethynylandrostane, M. P. 174.7–177.2° C. (corr.); $[\alpha]_D^{25} = -43.3° \pm 0.3°$ (1% in chloroform).

*Analysis.*—Calcd. for $C_{24}H_{36}O_3$: C, 77.37; H, 9.74. Found: C, 77.56; H, 10.07.

Example 13

3β,17β - dipropionoxy - 17α-ethynyl-5-androstene.—A suspension of 3.14 g. of 17α-ethynyl-5-androstene-3β,17β-diol in 15 ml. of pure propionic acid and 25 ml. of pure propionic anhydride at 25–32° C. was treated with 0.40 g. of powdered p-toluenesulfonic acid monohydrate. The mixture was shaken mechanically for fifteen minutes during which time the 17α-ethynyl-5-androstene-3β,17β-diol went into solution, heat was evolved and the mixture changed from colorless to a deep lilac color. The clear solution was allowed to stand at room temperature for eighteen hours and then poured into 1200 ml. of cold water. The resulting solid was removed by filtration, washed well with water and dried at 50° C. After two recrystallizations from n-hexane, 2.4 g. of 3β,17β-dipropionoxy-17α-ethynyl-5-androstene was obtained, M. P. 139.4–141.2° C. (corr.); $[\alpha]_D^{25} = -99.4° \pm 0.4°$ (1% in chloroform).

*Analysis.*—Calcd. for $C_{27}H_{38}O_4$: C, 76.02; H, 8.92. Found: C, 76.30; H, 8.75.

Example 14

3β - isobutroxy-17β-hydroxy-17α-ethynyl-5-androstene was prepared from 17α-ethynylandrostene-3β,17β-diol and isobutyric acid according to the method described in Example 9. The 3β-isobutyroxy-17β-hydroxy-17α-ethynyl-5-androstene thus obtained had the M. P. 168.2–170.4° C. (corr.); $[\alpha]_D^{25} = -102.4° \pm 0.3°$ (1% in chloroform).

*Analysis.*—Calcd. for $C_{25}H_{36}O_3$: C, 78.08; H, 9.44. Found: C, 78.30; H, 9.49.

Example 15

3β - isovaleroxy-17β-hydroxy-17α-ethynyl-5-androstene was prepared from 17α-ethynyl-5-androstene-3β,17β-diol and isovaleric acid according to the method described in Example 9. The 3β - isovaleroxy-17β-hydroxy-17α-ethynyl-5-androstene thus obtained had the M. P. 119.4–127.8° C. (corr.); $[\alpha]_D^{25} = -96.9° \pm 0.4°$ (1% in chloroform).

*Analysis.*—Calcd. for $C_{26}H_{38}O_3$: C, 78.35; H, 9.61. Found: C, 78.52; H, 9.84.

Example 16

3β - isocaproxy-17β-hydroxy-17α-ethynyl-5-androstene was prepared from 17α-ethynyl-5-androstene-3β,17β-diol and isocaproic acid according to the method described in Example 9. The 3β-isocaproxy-17β-hydroxy-17α-ethynyl-5-androstene thus obtained had the M. P. 135.6–138.4° C. (corr.); $[\alpha]_D^{25} = -92.7° \pm 0.4°$ (1% in chloroform).

*Analysis.*—Calcd. for $C_{27}H_{40}O_3$: C, 78.59; H, 9.77. Found: C, 78.41; H, 9.49.

Example 17

3β - isocaproxy-17β-hydroxy-17α-ethynylandrostane was prepared from 17α-ethynylandrostane-3β,17β-diol and isocaproic acid according to the method described in Example 9. The 1.4 g. of 3β-isocaproxy-17β-hydroxy-17α-ethynylandrostane thus obtained had the M. P. 142.6–144.2° C. (corr.); $[\alpha]_D^{25} = -34.1° \pm 0.3°$ (1% in chloroform).

*Analysis.*—Calcd. for $C_{27}H_{42}O_3$: C, 78.21; H, 10.21. Found: C, 78.53; H, 10.50.

Example 18

3β - (α-ethyl - n-butyroxy)-17β-hydroxy-17α-ethynylandrostane was prepared from 17α-ethynylandrostane-3β,17β-diol and 2-ethylbutyric acid according to the method described in Example 9. The 3β-(α-ethyl-n-butyroxy)-17β-hydroxy-17α-ethynylandrostane thus obtained had the M. P. 141–143° C. (uncorr.).

*Analysis.*—Calcd. for $C_{27}H_{42}O_3$: C, 78.21; H, 10.21. Found: C, 78.26; H, 9.84.

Example 19

3β-heptanoyloxy-17β-hydroxy-17α-ethynyl-5-androstene was prepared from 17α-ethynyl-5-androstene-3β,17β-diol and heptanoic anhydride according to the method described in Example 1. The 3β-heptanoyloxy-17β-hydroxy-17α-ethynyl-5-androstene thus obtained had the M. P. 89.0–97.2° C. (corr.).

*Analysis.*—Calcd. for $C_{28}H_{42}O_3$: C, 78.82; H, 9.92. Found: C, 78.60; H, 9.69.

Example 20

3β- nonanoyloxy- 17β- hydroxy- 17α- ethynylandrostane was prepared from 17α-ethynylandrostane-3β,17β-diol and nonanoic acid according to the method described in Example 9. The 3β-nonanoyloxy-17β-hydoxy-17α-ethynylandrostane thus obtained had the M. P. 88–90° C. (uncorr.).

*Analysis.*—Calcd. for $C_{30}H_{48}O_3$: C, 78.89; H, 10.59. Found: C, 78.77; H, 10.47.

Example 21

3β- decanoyloxy- 17β- hydroxy- 17α- ethynylandrostane was prepared from 17α-ethynylandrostane-3β,17β-diol and decanoic acid according to the method described in Example 9. The 3β-decanoyloxy-17β-hydroxy-17α-ethynylandrostane thus obtained had the M. P. 69–71° C. (uncorr.).

Analysis.—Calcd. for $C_{31}H_{50}O_3$: C, 79.10; H, 10.71. Found: C, 79.04; H, 10.78.

Example 22

3β-heptanoyloxy- 17β- hydroxy- 17α- ethynylandrostane was prepared from 17α-ethynylandrostane-3β,17β-diol and heptanoic anhydride according to the method described in Example 1. The 3β-heptanoyloxy-17β-hydroxy-17α-ethynylandrostane thus obtained melted at 89.8–91.4° C. (corr.).

Analysis.—Calcd. for $C_{28}H_{44}O_3$: C, 78.45; H, 10.35. Found: C, 78.54; H, 10.21.

Example 23

3β-(α- ethyl-n-butyroxy)- 17β- hydroxy-17α- ethynyl-5-androstene was prepared from 17α-ethynyl-5-androstene-3β,17β-diol and 2-ethylbutyric acid according to the method described in Example 9. There was thus obtained 3β-(α-ethyl-n-butyroxy)-17β-hydroxy-17α-ethynyl-5-androstene, M. P. 171.4–173.8° C. (corr.).

Analysis.—Calcd. for $C_{27}H_{40}O_3$: C, 78.59; H, 9.77. Found: C, 78.58; H, 10.07.

Example 24

3β-nonanoyloxy-17β-hydroxy-17α-ethynyl-5-androstene was prepared from 17α-ethynyl-5-androstene and nonanoic acid according to the method described in Example 9. The 3β-nonanoyloxy-17β-hydroxy-17α-ethynyl-5-androstene thus obtained had the M. P. 91.6–93.4° C. (corr.).

Analysis.—Calcd. for $C_{30}H_{46}O_3$: C, 79.25; H, 10.20. Found: C, 79.24; H, 10.37.

Example 25

3β-(γ- carboxybutyroxy)-17β- hydroxy-17α- ethynylandrostane can be prepared from 17α-ethynylandrostane-3β,17β-diol and glutaric anhydride according to the method described in Example 8.

Example 26

3β-isovaleroxy-17β-hydroxy-17α-ethynylandrostane can be prepared from 17α-ethynylandrostane-3β,17β-diol and isovaleric acid according to the method described in Example 9.

We claim:

1. A compound selected from the group consisting of 3β-acyloxy-17β-hydroxy-17α-ethynylandrostanes and 3β-acyloxy-17β-hydroxy-17α-ethynyl-5-androstenes wherein the acyl group is a member of the group consisting of alkanoyl radicals having from 3 to about 10 carbon atoms and carboxy-alkanoyl radicals having from 4 to 6 carbon atoms.

2. A 3β- acyloxy-17β- hydroxy-17α-ethynylandrostane wherein the acyl group is an alkanoyl radical having from 3 to about 10 carbon atoms.

3. A 3β- acyloxy-17β- hydroxy- 17α- ethynyl-5- androstene wherein the acyl group is an alkanoyl radical having from 3 to about 10 carbon atoms.

4. A 3β-acyloxy-17β- hydroxy-17α- ethynylandrostane wherein the acyl group is a carboxy-alkanoyl radical having 4 to 6 carbon atoms.

5. A 3β-acyloxy-17β-hydroxy-17α-ethynyl-5-androstene wherein the acyl group is a carboxy-alkanoyl radical having 4 to 6 carbon atoms.

6. 3β- propionoxy-17β- hydroxy- 17α- ethynyl-5- androstene.

7. 3β-trimethylacetoxy-17β-hydroxy-17α-ethynylandrostane.

8. 3β-caproxy-17β-hydroxy-17α-ethynylandrostane.

9. 3β-succinoxy-17β-hydroxy-17α-ethynyl-5-androstene.

10. 3β - butyroxy- 17β- hydroxy- 17α- ethynyl-5- androstene.

11. The process of preparing a 3β-acyloxy-17β-hydroxy-17α-ethynylandrostane which comprises reacting 17α-ethynylandrostane-3β,17β-diol with an alkanoic anhydride, $(RCO)_2O$, wherein RCO is an alkyanoyl group having from 3 to about 10 carbon atoms.

12. The process of preparing a 3β-acyloxy-17β-hydroxy-17α-ethynyl-5-androstene which comprises reacting 17α-ethynyl-5-androstene-3β,17β-diol with an alkanoic anhydride, $(RCO)_2O$, wherein RCO is an alkanoyl group having from 3 to about 10 carbon atoms.

13. The process of preparing a 3β-acyloxy-17β-hydroxy-17α-ethynylandrostane which comprises reacting 17α-ethynylandrostane-3β,17β-diol with an anhydride of an alkanedioic acid having from 4 to 6 carbon atoms.

14. The process of preparing a 3β-acyloxy-17β-hydroxy-17α-ethynyl-5-androstene which comprises reacting 17α-ethynyl-5-androstene-3β,17β-diol with an anhydride of an alkanedioic acid having from 4 to 6 carbon atoms.

15. The process of preparing a 3β-acyloxy-17β-hydroxy-17α-ethynylandrostane which comprises reacting 17α-ethynylandrostane-3β,17β-diol with an alkanoic acid halide having from 3 to about 10 carbon atoms.

16. The process of preparing a 3β-acyloxy-17β-hydroxy-17α-ethynyl-5-androstene which comprises reacting 17α-ethynyl-5-androstene-3β,17β-diol with an alkanoic acid halide having from 3 to about 10 carbon atoms.

17. The process of preparing a compound selected from the group consisting of 3β-acyloxy-17β-hydroxy-17α-ethynylandrostanes and 3β-acyloxy-17β-hydroxy-17α-ethynyl-5-androstenes which comprises reacting 17α-ethynylandrostane-3β,17β-diol or 17α-ethynyl-5-androstene-3β,17β-diol with an alkanoic acylating agent derived from an alkanoic acid having from 3 to about 10 carbon atoms in the case wherein the acyl group is an alkanoyl radical, and with an alkanedioic acylating agent derived from an alkanedioic acid having from 4 to 6 carbon atoms in the case wherein the acyl group is a carboxy-alkanoyl radical.

References Cited in the file of this patent

UNITED STATES PATENTS

| | | |
|---|---|---|
| 2,243,887 | Serini | June 3, 1941 |
| 2,266,778 | Logemann | Dec. 23, 1941 |
| 2,267,257 | Ruzicka | Dec. 23, 1941 |
| 2,272,131 | Ruzicka | Feb. 3, 1942 |
| 2,374,369 | Mescher | Apr. 24, 1945 |
| 2,387,469 | Ruzicka | Oct. 23, 1945 |

FOREIGN PATENTS

| | | |
|---|---|---|
| 59,004 | Denmark | Sept. 8, 1941 |
| 78,818 | Denmark | Feb. 7, 1955 |

UNITED STATES PATENT OFFICE
Certificate of Correction

Patent No. 2,868,811 January 13, 1959

Raymond O. Clinton et al.

It is hereby certified that error appears in the printed specification of the above numbered patent requiring correction and that the said Letters Patent should read as corrected below.

Column 1, line 18, for "estrongenicity" read —estrogenicity—; column 3, line 4, for "carboxyl-acyl" read —carboxy-acyl—; line 54, for "77.75" read —77.95—; line 59, for "prepared 6.32 g." read —prepared from 6.32 g.—; column 4, line 6, for "portions, or" read —portions of—; line 23, for "weight" read —weighed—; column 6, line 5, for "3β-isobutroxy-" read —3β-isobutyroxy- —; line 71, for "-hydoxy-" read — -hydroxy- —.

Signed and sealed this 28th day of April 1959.

[SEAL]

Attest:
T. B. MORROW,
*Attesting Officer.*

ROBERT C. WATSON,
*Commissioner of Patents.*